(12) United States Patent
Acharya et al.

(10) Patent No.: US 10,545,920 B2
(45) Date of Patent: Jan. 28, 2020

(54) DEDUPLICATION BY PHRASE SUBSTITUTION WITHIN CHUNKS OF SUBSTANTIALLY SIMILAR CONTENT

(71) Applicant: INTERNATIONAL BUSINESS MACHINES CORPORATION, Armonk, NY (US)

(72) Inventors: Alka A Acharya, Pune (IN); Lloyd W. Allen, Jr., Research Triangle Park, NC (US); Jana H Jenkins, Durham, NC (US); Abigail Samuel, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 584 days.

(21) Appl. No.: 14/817,296

(22) Filed: Aug. 4, 2015

(65) Prior Publication Data
US 2017/0039219 A1 Feb. 9, 2017

(51) Int. Cl.
*G06F 16/174* (2019.01)
(52) U.S. Cl.
CPC .............................. *G06F 16/1752* (2019.01)
(58) Field of Classification Search
None
See application file for complete search history.

(56) References Cited

U.S. PATENT DOCUMENTS

| | | | | |
|---|---|---|---|---|
| 5,991,713 A | * | 11/1999 | Unger | H03M 7/3084 704/1 |
| 7,610,382 B1 | * | 10/2009 | Siegel | G06F 17/2264 704/10 |
| 7,689,910 B2 | | 3/2010 | Hennum et al. | |
| 7,945,525 B2 | | 5/2011 | Ananthanarayanan et al. .... 14/2 |
| 8,630,970 B2 | | 1/2014 | Bryce | |
| 8,631,026 B1 | | 1/2014 | Tucker et al. | |

(Continued)

FOREIGN PATENT DOCUMENTS

| EP | 1325430 A2 | 7/2003 |
|---|---|---|
| EP | 1846815 A2 | 10/2007 |

OTHER PUBLICATIONS

Xin Zhou; A New Wildcard Search Method for Digital Dictionary Based on Mobile Platform; IEEE; 2006; pp. 1-5 (Year: 2006).*

*Primary Examiner* — Mariela Reyes
*Assistant Examiner* — Jermaine A Mincey
(74) *Attorney, Agent, or Firm* — Griffiths & Seaton PLLC (57) ABSTRACT

A method, system and computer program product for phrase substitution within chunks of substantially similar content. The method includes: retrieving from content files a first and a second content chunk which are identical above a predetermined threshold; identifying a candidate for substitution, wherein the candidate for substitution is a string of characters in the second content chunk that is not identical to a corresponding string of characters in the first content chunk; comparing the candidate for substitution with a synonym database to find a match, wherein the synonym database provides a plurality of synonym suggestions to convert the candidate for substitution in the first content chunk and the second content chuck to an identical string of characters; replacing the candidate for substitution with a reference to the identical string of characters; and storing a single copy of the identical string of characters in a common repository.

20 Claims, 5 Drawing Sheets

(56) References Cited

U.S. PATENT DOCUMENTS

| | | | |
|---|---|---|---|
| 2005/0131939 A1* | 6/2005 | Douglis | G06F 11/1453 |
| 2010/0286978 A1* | 11/2010 | Zhou | G06F 17/2827 |
| | | | 704/7 |
| 2011/0035403 A1* | 2/2011 | Ismalon | G06F 17/3064 |
| | | | 707/769 |
| 2011/0040552 A1* | 2/2011 | Van Guilder | G06F 17/246 |
| | | | 704/4 |
| 2011/0320186 A1* | 12/2011 | Butters | G06F 16/3338 |
| | | | 704/9 |
| 2013/0144847 A1 | 6/2013 | Spurlock | |
| 2014/0085323 A1 | 3/2014 | Wang et al. | |
| 2014/0172456 A1* | 6/2014 | Qian | G16H 15/00 |
| | | | 705/3 |
| 2014/0280285 A1 | 9/2014 | Quinion et al. | |
| 2014/0288915 A1 | 9/2014 | Madnani et al. | |
| 2014/0358519 A1 | 12/2014 | Mirkin et al. | |

\* cited by examiner

DEDUPLICATION BY PHRASE SUBSTITUTION WITHIN CHUNKS OF SUBSTANTIALLY SIMILAR CONTENT

BACKGROUND OF THE INVENTION

1. Field of the Invention

The present invention relates to general computing systems, and more specifically, to a method, system, and computer program product for improved data deduplication using phrase substitution to enhance efficiency in computing storage environments.

2. Description of the Related Art

Computer systems frequently include data or disk storage systems to process and store data. A data or disk processing system requires a large amount of data storage. Data generated by a user within the data or disk processing system occupies a large portion of the available data storage space. Disk drives can exist as a solo entity, or as part of a broader makeup within a larger storage environment. Regardless of the size of the storage environment, often duplicate data is written.

Duplicated content takes up a large amount of storage space. This replicated data can be de-duplicated using standard deduplication techniques. Data deduplication refers to the reduction and/or elimination of redundant data. In a common data deduplication process, duplicate copies of data are reduced or eliminated, leaving a minimal amount of redundant copies, or a single copy of the data, respectively. Identical, repetitive storage of data that used to be written multiple times within a storage system, only needs to be written once and referred to by pointers.

SUMMARY OF THE INVENTION

The present invention provides a computer implemented method for phrase substitution within chunks of substantially similar content, the method including: retrieving from a set of content files a first content chunk and a second content chunk which are identical above a predetermined threshold; identifying a candidate for substitution, wherein the candidate for substitution is a string of characters in the second content chunk that is not identical to a corresponding string of characters in the first content chunk; comparing the candidate for substitution with a synonym database to find a match, wherein the synonym database provides a plurality of synonym suggestions to convert the candidate for substitution in the first content chunk and the second content chuck to an identical string of characters; replacing the candidate for substitution with a reference to the identical string of characters; and storing a single copy of the identical string of characters in a common repository.

Additionally, the present invention provides a system for phrase substitution within chunks of substantially similar content, including: a processor device, wherein the processor device: retrieves from a set of content files a first content chunk and a second content chunk which are identical above a predetermined threshold; identifies a candidate for substitution, wherein the candidate for substitution is a string of characters in the second content chunk that is not identical to a corresponding string of characters in the first content chunk; compares the candidate for substitution with a synonym database to find a match, wherein the synonym database provides a plurality of synonym suggestions to convert the candidate for substitution in the first content chunk and the second content chuck to an identical string of characters; replaces the candidate for substitution with a reference to the identical string of characters; and stores a single copy of the identical string of characters in a common repository.

Another aspect of the present invention provides a computer program product for phrase substitution within chunks of substantially similar content, the computer program product including a non-transitory computer-readable storage medium having computer-readable program code portions stored therein, the computer-readable program code portions including: a first executable portion that retrieves from a set of content files a first content chunk and a second content chunk which are identical above a predetermined threshold; a second executable portion that identifies a candidate for substitution, wherein the candidate for substitution is a string of characters in the second content chunk that is not identical to a corresponding string of characters in the first content chunk; a third executable portion that compares the candidate for substitution with a synonym database to find a match, wherein the synonym database provides a plurality of synonym suggestions to convert the candidate for substitution in the first content chunk and the second content chuck to an identical string of characters; a fourth executable portion that replaces the candidate for substitution with a reference to the identical string of characters; and a fifth executable portion that stores a single copy of the identical string of characters in a common repository.

BRIEF DESCRIPTION OF THE DRAWINGS

In order for the advantages of the embodiments of the present invention to be readily understood, a more particular description of the embodiments briefly described will be rendered by reference to specific embodiments that are illustrated in the appended drawings. These drawings depict only some embodiments and are not therefore to be considered to be limiting of scope. The embodiments will be described and explained with additional specificity and detail through the use of the accompanying drawings, in which.

DETAILED DESCRIPTION

The present invention provides a method, system and computer program product for improved data deduplication using phrase substitution to enhance efficiency in computing storage environments. Nearly identical content is identified. According to the present invention, nearly identical content is a content chunk or block which is identical above a predetermined threshold percentage value to one or more other content chunks or blocks within a storage environment. A user is prompted with suggested changes to convert the nearly identical content to completely identical content and a single copy of the identical content is maintained.

Customarily, phrase substitution refers to replacing an existing word, sentence, or string of characters with an alternative, usually more concise, word, sentence or string of characters. According to the present invention, data files or data chunks that are identified as identical above a predetermined threshold are analyzed and using phase substitution are modified into completely identical data chunks. Duplicate copies of the now identical data are eliminated implementing data deduplication techniques. A single copy of the identical data can be stored in a data repository. Thus, according to embodiments of the present invention, storage requirements are reduced because only a single instance of the identical data is maintained and duplicate copies are eliminated.

In file storage systems data deduplication has become an increasingly signification solution to reducing redundant data. Data deduplication refers to eliminating multiple copies of duplicated data and storing a minimal amount of redundant copies, or a single instance of the duplicated data. In data deduplication, a data object is broken down into one or more parts generally called chunks or blocks. A data object can be a file, a document, a data stream, or some other form of data.

Data deduplication increases storage capacity in storage systems. Data deduplication technology enables elimination of duplicate information in a storage environment, such that the storage space held by the duplicate information is released, opening up potentially significant amounts of additional storage space in the computing storage environment. Obstacles in data deduplication include adequately finding the duplicated data in a typically large repository, and storing the data in a storage efficient deduplicated form.

Several deduplication techniques exist to deduplicate redundant files. For example, a file can be analyzed against another file to determine if the file has the same size, name, and contents when analyzed at the block-by-block level. Furthermore, several types of data are highly deduplicative in nature, while others are not. For example, in certain instances a deduplication ratio of 5 to 1 is reached, whereas in another case only a ratio of 3 to 1 is reached.

In phrase substitution the replacement string of characters must have the same functionality or meaning as the string of characters it is replacing. The sentence must also be grammatically correct with the replacement string of characters.

In the present invention, data chunks within a storage system are analyzed for identical content above a predetermined threshold percentage value. Chunks of content are separated from one another by delimiters. For example, one data chunk is separated from another data chunk using a character such as a period or comma. Other data chunks are separated from one another using tags.

Various exemplary embodiments of the present invention allow a user to specify the size of each content chunk analyzed for identical content above a predetermined threshold. Additionally, the user can designate the delimiters used to separate content chunks from one another.

According to aspects of the present invention, the predetermined threshold value is set as a percentage value. Data chunks, of a user specified size within a storage system, are analyzed for identical content above the predetermined threshold. Two or more data chunks are selected having identical content at a percentage equal to or greater than the predetermined threshold value. The predetermined threshold value is set and controlled by a user. In various embodiments of the present invention, the predetermined threshold value is set by a central group.

According to an exemplary embodiment of the present invention, a user can adjust and set the predetermined threshold value for identical content in a data chunk or string of characters at 95%. According numerous embodiments of the present invention, the predetermined threshold value is set to 90%. According to yet another embodiment of the present invention, the predetermined threshold value for identical strings of characters between two content chunks is set to a value equal to or greater than 75%.

Darwin Information Type Architecture (DITA) is a w3 XML standard for semantic tagging of content or data for product documentation. In DITA, data elements are organized and analyzed logically based on how they relate to one another. According to embodiments of the present invention, DITA can be implemented as a plugin. Thereby, within a set of content files synonyms or semantic terms are processed and reused without duplication in multiple places. The common content is stored. According to embodiments of the present invention, on an enterprise level, advantages include the ability to enforce proper terminology of significant vocabulary resulting in optimization of content management. Common content is stored as format-agnostic, so that collaboration across the enterprise is possible.

Once the predetermined threshold value is determined and set, the computer implemented method, system, and computer program product analyzes data chunks that are tagged or separated by delimiters from a set of content files. Two data chunks are selected, a first data chunk and a second data chunk, which are identical above the predetermined threshold for processing. A candidate for substitution is identified. The candidate for substitution is a string of characters in the second content chunk that is not identical to a corresponding string of characters in the first content chunk. The candidate for substitution is compared with a synonym database to find an appropriate synonym, match or related concept.

The synonym database finds at least one match for the candidate for substitution. Generally, the synonym database provides a plurality of matches (synonyms or related concepts) for the candidate for substitution. The plurality of matches for the candidate for substitution includes a primary entry identified as the recommended string of characters for replacement. According to embodiments of the present invention, a company-recommended string of characters (term or phrase) is stored as the primary entry in the synonym database. Alternatively, consistent with embodiments of the present invention, the first content chunk is stored as the primary entry string of characters for replacement.

Once identified, a user is prompted to replace the candidate for substitution, a string of characters in the second content chunk that is not identical to a corresponding string of characters in the first content chunk, from the plurality of matches identified within the synonym database. The user selects the desired replacement term, an identical string of characters. The user can select the primary entry as the recommended string of characters for replacement, or alternatively select any other match identified.

Once a user selects an identical string of characters as a replacement for the candidate for substitution, one copy of the identical string of characters is stored with references to it. Content chunks are not replaced with another chunk containing the identical string of characters. Instead the candidate for substitution is replaced with a content reference. The reference to the identical string of characters from the synonym database is stored as a single copy of identical content in a common repository.

The common repository eliminates a significant amount of content maintenance and thereby saves storage space. The present invention stores only one copy of the identical content, the identical string of characters, in the common repository. According to embodiments of the present invention, the content reference is added in the first content chunk and the second content chunk. Additionally, the content reference is added to other identical content chunks above the predetermined threshold having the candidate for substitution in a set of content files.

A novel aspect of the present invention includes forming a report containing the candidate for substitution. The report measures content patterns and duplicate data in the set of content files. The report permits global replacement, global manipulation, of the candidate for substitution with the reference to the identical string of characters in the set of content files. Additionally, the report allows a user to view all the identical content chunks above the predetermined threshold in a convenient location and the ability to enforce proper terminology resulting in optimization of content management.

Moreover, the present invention provides a statistical analysis tool. The statistical analysis tool generates data deduplication reports. According to embodiments of the present invention, data deduplication reports are interactive graphs and charts that overlay the actual data and present the patterns and amount of duplication in a set of content files for measurement and improvement by deduplication. By overlaying the actual data, data manipulation is permissible.

A user can manipulate the underlying data based on the patterns provided by the reports. The solution can be further enhanced to analyze reused content, files with a reference to common content and common files, to generate statistical and reusability reports that are used to determine if the present invention provided proper phase substitution. Furthermore, the statistical analysis assists in planning for maintenance of reused content.

According to various exemplary embodiments of the present invention, a central group is formed. The central group maintains and documents a synonym database for consistency, resulting in optimization of content management. The central group maintains and documents the synonym database at one central location for updates. The central location then transmits the updates and modifications to a plurality of other locations in the set of content files that reference the synonym database.

Aspects of the present invention increase efficiency and productivity within computer systems including data or disk storage systems. The present invention provides an automated method to maintain consistency and adherence to enterprise or user specific guidelines. Information developers and users can ensure that all common information is documented consistently and is stored as format-agnostic.

Furthermore, maintenance and manageability of content at one central location, according to embodiments of the present invention, reduces the maintenance of identical content at a plurality of locations within a large network. The computer system ensures that a change in the synonym database, whether a change or an update in a guideline or a new inclusion, at the central location is reflected at all the locations that reference it.

Compressing data is an effective way to save space on storage systems. The present invention enables efficient storage and distribution of content. Multiple copies of data that is identical above a predetermined threshold is consolidated to a single copy of identical data by inserting a reference to a selected identical string of characters to a term. Duplicate results are eliminated thereby reducing disk space requirements.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
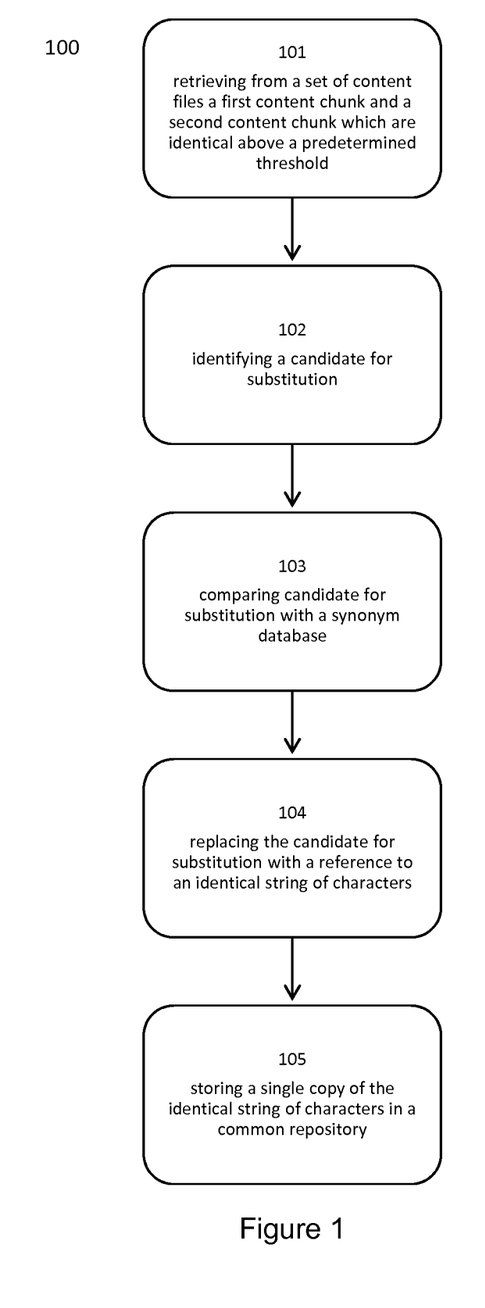
FIG. 1 depicts a flowchart diagram of an exemplary method for improved data deduplication using phrase substitution to enhance efficiency in computing storage environments according to embodiments of the present invention.

FIG. 1 is a flowchart diagram illustrating an exemplary method for improved data deduplication using phrase substitution to enhance efficiency in computing storage environments according to embodiments of the present invention.

In method 100, a first content chunk and a second content chunk, which are identical above a predetermined threshold, are identified and retrieved from a set of content files at step 101. Content chunks are separated by delimiters. According to an embodiment of the present invention, a user determines the size specifications for a content chunk. Additionally, a user can specify how to separate chunks of content using delimiters. According to embodiments of the present invention, a central group can specify the size and delimiters, including DITA tags, of a content chunk. A user or a central group specifies the percentage of similarity required by the predetermined threshold. In a preferred embodiment of the present invention, the predetermined threshold is set to 95% similarity between two or more content chunks.

With continued reference to FIG. 1, at step 102 a candidate for substitution is identified. A candidate for substitution is a string of characters in the second content chunk that is not identical to a corresponding string of characters in the first content chunk. At step 103 the candidate for substitution is compared with a synonym database. The present invention determines a plurality of synonym matches for the candidate for substitution. Next, a user is prompted with the plurality of synonym suggestions, including a recommendation, for an identical string of characters. The user selects an appropriate identical string of characters as a replacement for the candidate for substitution in the first content chunk and the second content chuck.

At step 104 the candidate for substitution is replaced with a reference to the identical string of characters. Content chunks are not replaced with another chunk, rather they are replaced with a content reference. According to embodiments of the present invention, at step 105 a single copy of the identical string of characters is stored in a common repository.

Figure 2:
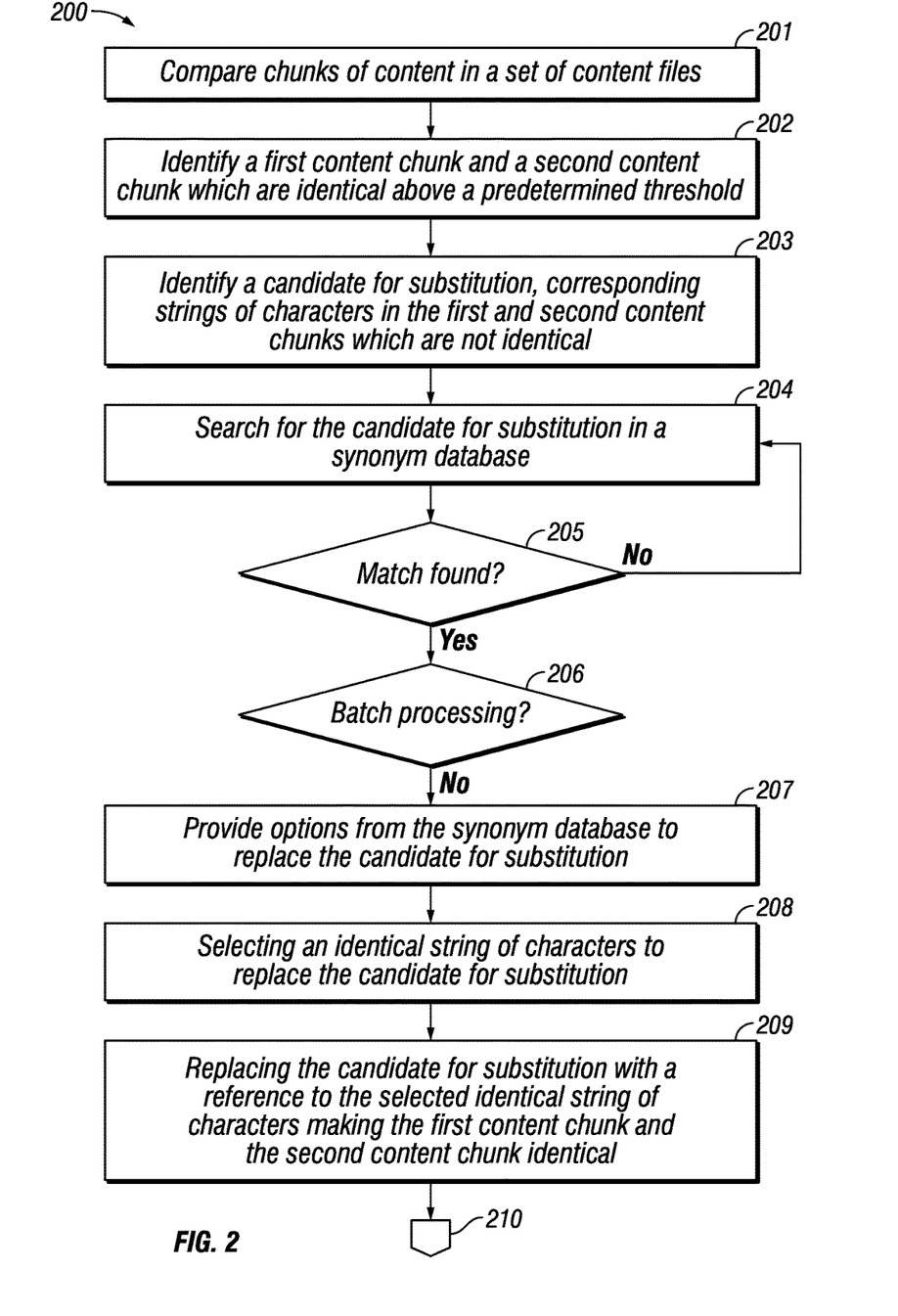
FIG. 2 is another detailed flowchart diagram portraying an exemplary method for improved data deduplication using phrase substitution to enhance efficiency in computing storage environments according to embodiments of the present invention.

FIG. 2 is another detailed flowchart diagram of an exemplary method 200 for improved data deduplication using phrase substitution to enhance efficiency in computing storage environments according to embodiments of the present invention.

In FIG. 2, method 200 compares chunks of content in a set of content files at step 201. The chunks of content are processed to determine how similar or dissimilar different content chunks are from one another. At step 202, a first content chunk and a second content chunk are identified. The first content chunk and the second content chunk are identical above a predetermined threshold. The predetermined threshold is a percentage of similarity that correlates between the first content chunk and the second content chunk.

At step 203 a candidate for substitution identified. The candidate for substitution correlates to a corresponding string of characters in the first content chunk and second content chunk which are not identical. At step 204 a plurality of synonyms analogous to the candidate for substitution are searched for within the synonym database. At step 205 relevant synonym matches to the candidate for substitution are identified and retrieved. If no matches are retrieved the method returns to step 204 and the synonym database searches for new potential matches.

At step 205 if relevant matches to the candidate for substitution are identified and retrieved the method continues to step 206, batch processing. At step 206, batch processing, all of the synonym options to replace the candidate for substitution are organized. A recommendation or primary candidate for an identical string of characters to replace the candidate for substitution in each content chunk is identified.

At step 207 the replacement synonym options from the synonym database to replace the candidate for substitution are provided. In embodiments of the present invention, at step 207 a user is prompted with the plurality of synonym suggestions, including a recommendation, for the identical string of characters to replace the candidate for substitution. At step 208 an identical string of characters from the plurality of synonym suggestions is selected to replace the candidate for substitution. The appropriate identical string of characters selected by the user serves as a replacement synonym for the candidate for substitution in the first content chunk and the second content chuck.

With continued reference to FIG. 2, at step 209 the candidate for substitution is removed and replaced in the first content chunk and the second content chunk. The candidate for substitution is replaced with a reference to the selected identical string of characters. In an embodiment of the present invention, once the reference to the selected identical string of characters replaces the candidate for substitution, the first content chunk and second content chunk are identical to one another.

According to other various exemplary embodiments of the present invention, in order to form two identical content chunks, one or more other candidates for substitution are identified within the first and the second content chunks and replaced by selected identical strings of characters in accordance with steps 201 to 209 of FIG. 2. First, the new candidate for substitution is identified. Next, the new candidate for substitution is replaced with a new reference to an identical string of characters selected by a user. At step 210 a single copy of the newly formed identical content, either the first content chunk or the second content chunk, is stored in a common repository.

Figure 3:
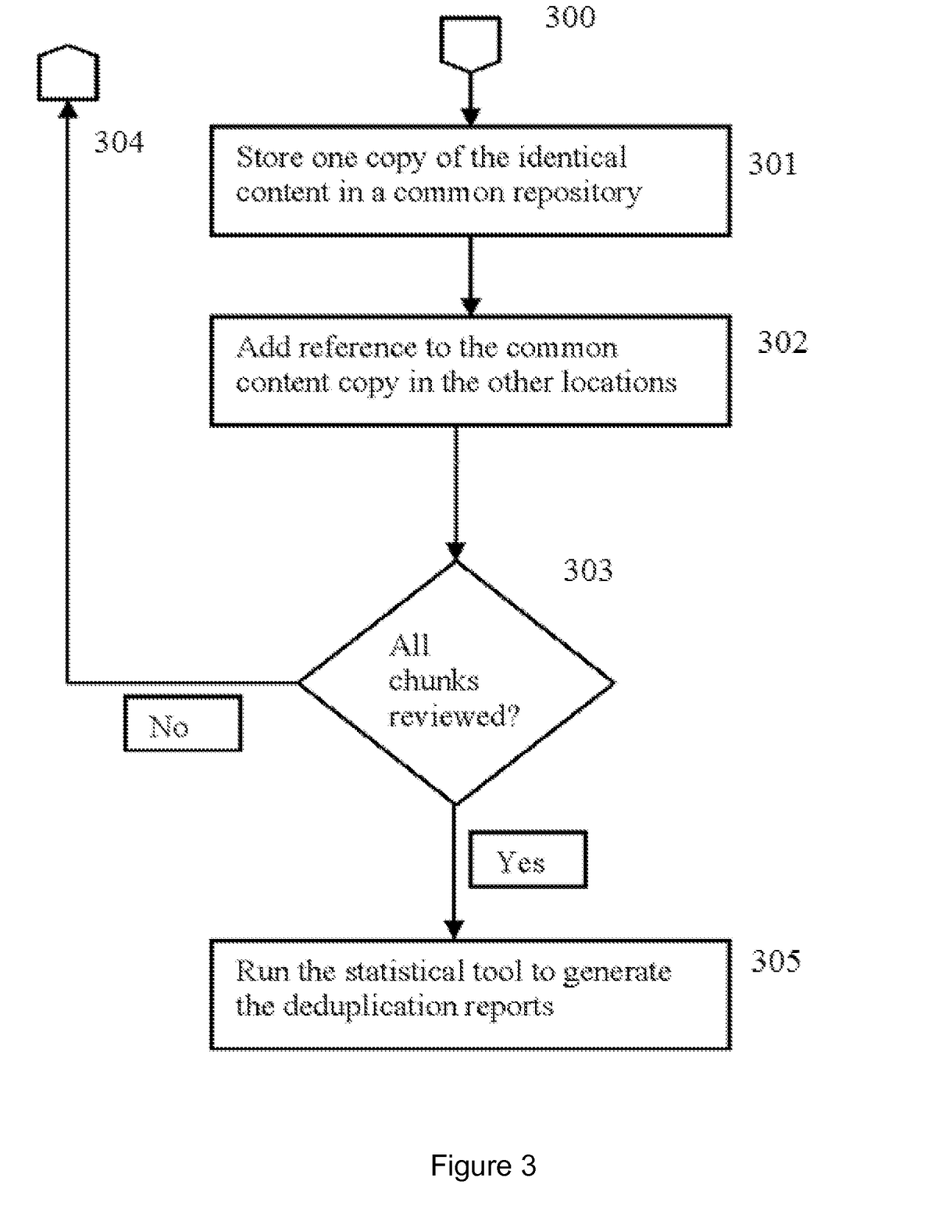
FIG. 3 is a flowchart diagram illustrating a method for consolidating multiple copies of identical content above a predetermined threshold in a set of content files to a single copy of identical data placed in a common repository and generating deduplication reports.

FIG. 3 is a flowchart diagram illustrating a method for consolidating multiple copies of identical content above a predetermined threshold in a set of content files to a single copy of identical data placed in a common repository and generating deduplication reports.

In consonance with embodiments of the present invention, the method 300 illustrated in FIG. 3 commences at step 210 in FIG. 2. According to alternative embodiments of the present invention, FIG. 3 commences only once all the candidates for replacement are identified and replaced in the first content chunk and the second content chunk by a plurality of common references.

At step 301 one copy of identical content, either the first content chunk or the second content chunk, is stored in a common repository. At step 302 content chunks in other locations which are identical above a predetermined threshold to the first content chunk or second content chunk are identified and retrieved from a set of content files. A candidate for replacement is identified in the content chunks in other locations. Next, the reference to the identical string of characters replaces the candidate for replacement in the other locations, thereby producing other identical data chunks. If a content chunk contains more than one candidate for replacement, the remaining candidates for replacement are identified and replaced respectively with corresponding references to an identical string of characters selected by a user in an earlier step.

According to embodiments of the present invention, at step 303 the method determines whether all the content chunks from the set of content files have been examined for identical content above the predetermined threshold. If step 303 returns no, then the method proceeds to step 304 which is equivalent to recommencing method 300 at step 301. If step 303 returns yes, the method proceeds to step 305.

At step 305 a single report is generated. The present invention includes an option for a user to view and interact with all candidate for substitution content chunks in the single report. Using the single report, the user can choose to globally replace the candidate for substitution at all locations with the selected identical string of characters. Once all of the identical content chunks above a predetermined threshold are modified into identical content chunks, a single copy of the identical content chunk is placed in the common repository, and a reference to it is added at other locations in the set of content files.

Furthermore, at step 305 all of the content chunks in the set of content files which contain substantially similar content, content analogous above a predetermined threshold, are successfully converted to identical content chunks. In accordance with embodiments of the present invention, a statistical tool generates data deduplication reports. The data deduplication reports include a statistical analysis which overlays actual content allowing for global manipulation of the data. Data deduplication reports are interactive graphs and charts that overlay the actual data and present the patterns and amount of duplication for measurement and improvement by deduplication. By overlaying the actual data, data manipulation is permissible. A user can manipulate the underlying data based on the patterns provided by the reports.

The solution can be further enhanced to analyze reused content, files with a reference to common content and common files, to generate statistical and reusability reports that are used to determine if the present invention provided proper phase substitution. Furthermore the statistical analysis assists in planning for maintenance of reused content. The statistical tool illustrates patterns and repetitions found in the data.

Figure 4:
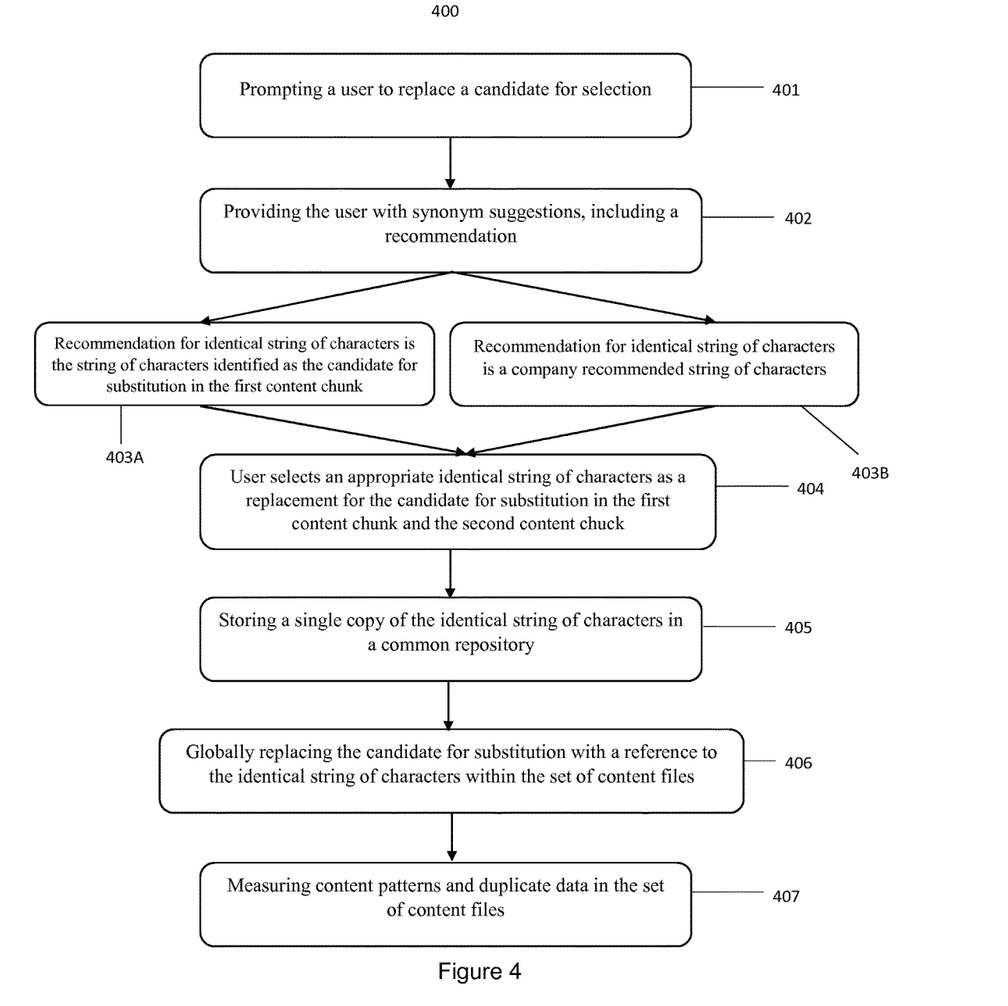
FIG. 4 is a detailed flowchart diagram of an exemplary method for selecting and replacing a candidate for substitution with an identical string of characters from a synonym database.

FIG. 4 is a detailed flowchart diagram of an exemplary method for selecting and replacing a candidate for substitution with an identical string of characters from a synonym database. According to embodiments of the present invention, the method embodied in FIG. 4 is similar to the method exemplified in steps 207, 208 and 209 of FIG. 2.

FIG. 4 details method 400, selecting and replacing a candidate for substitution with an identical string of characters from a synonym database. A candidate for substitution is a string of characters in a second content chunk that is not identical to a corresponding string of characters in a first content chunk, where the first content chunk and the second content chunk are identical above a predetermined threshold. The predetermined threshold is a percentage of similarity between two data chunks and is set by a user. In step 401 a user is prompted to replace a candidate for selection. A user can be an individual. In accordance with embodiments of the present invention, a user can be a central group, where information developers at one or more central locations can ensure that all common information is documented consistently. On an enterprise level, advantages of a central group include the ability to enforce proper terminology of significant vocabulary resulting in optimization of content management. Common content is stored as format-agnostic, so that collaboration across an enterprise is possible.

At step 402 the synonym database prompts a user with synonym suggestions for replacing the candidate for substitution. The synonym suggestions include a recommendation for an identical string of characters. The recommendation is set by a user or system administrator and is the primary entry stored in synonym database. According to various embodiments of the present invention, as depicted in step 403, the recommendation provided is dependent upon the type of user, whether an individual, enterprise, or other type of person or group of people.

As depicted in step 403A, a recommendation for the identical string of characters is the string of characters identified as the candidate for substitution in the first content chunk. In a preferred embodiment of the present invention, as depicted in step 403B, a recommendation for the identical string of characters is a company or enterprise recommended string of characters. A company recommended string of characters permits an enterprise to enforce and advocate proper terminology of significant vocabulary. In further embodiments of the present invention, a recommendation for the identical string of characters is a system selected synonym stored as the primary entry.

With continued reference to FIG. 4, after the user is prompted with the synonym suggestions, including a recommendation, the user selects an appropriate identical string of characters at step 404. The identical string of characters that the user selects serves as a replacement string of characters for the candidate for substitution in the first content chunk and the second content chunk. At step 405 a single copy of the identical string of characters selected by the user, in step 404, is stored in a common repository. According to embodiments of the present invention, a central group maintains and documents the synonym database for consistency at one central location. Additionally, the one central location is able to transmit all updates to the synonym database and content chunks to a plurality of other locations in the set of content files that reference the synonym database.

A report is formed containing the candidate for substitution. At step 406 the candidate for substitution is globally replaced with a reference to the identical string of characters in the set of content files. All of the content chunks in the set of content file that reference the synonym database which are identical above the predetermined threshold are identical at step 406 with respect to the non-identical candidate for substitution. At step 407 content patterns and duplicate data in the set of content files is measured. Additionally, a statistical tool generates deduplication reports.

Figure 5:
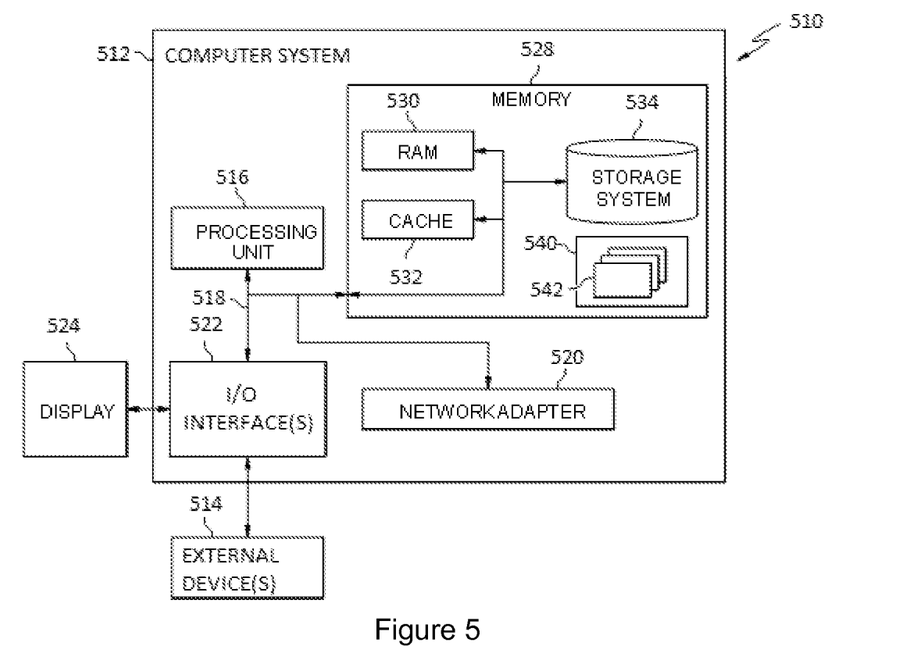
FIG. 5 is a block diagram of an exemplary computer system/server which is applicable to implement embodiments of the present invention.

FIG. 5 is a block diagram of an exemplary computer system/server which is applicable to implement embodiments of the present invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 5 shows a block diagram of an exemplary computer system/server 512 which is applicable to implement the embodiments of the present invention. The computer system/server 512 shown in FIG. 5 is only illustrative and is not intended to suggest any limitation as to the scope of use or functionality of embodiments of the invention described herein.

As shown in FIG. 5, computer system/server 512 is shown in the form of a general-purpose computing device. The components of computer system/server 512 can include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media can be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 can further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 can include at least one program product having a set (e.g., at least one) of program modules that are configured to carry out the functions of embodiments of the invention.

Program/utility 540, having a set (at least one) of program modules 542, can be stored in memory 528, by way of example, and not limitation, as well as an operating system, one or more application programs, other program modules, and program data. Each of the operating system, one or more application programs, other program modules, and program data or some combination thereof, can include an implementation of a networking environment. Program modules 542 generally carry out the functions and/or methodologies of embodiments of the invention as described herein.

Computer system/server 512 can also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components can be used in conjunction with computer system/server 512. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Rash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for phrase substitution within chunks of substantially similar content, the method comprising:
   retrieving, by a processor, from a set of content files stored in a data storage system, a first content chunk and a second content chunk which are identical above a predetermined threshold;
   identifying a candidate for substitution, wherein the candidate for substitution is a string of characters in the second content chunk that is not identical to a corresponding string of characters in the first content chunk;
   comparing the candidate for substitution with a synonym database to find a match, wherein the synonym database provides a plurality of synonym suggestions to convert the candidate for substitution in the first content chunk and the second content chuck to an identical string of characters;
   replacing the candidate for substitution with a reference to the identical string of characters thereby deduplicating the first content chunk and the second content chunk such that the identical string of characters itself is not substituted in the first content chunk and the second content chunk notwithstanding a pointer to the identical string of characters is created within the first content chunk and the second content chunk in place of the candidate for substitution, the pointer referencing the identical string of characters stored within a common repository, wherein all instances of the candidate for substitution within the set of content files are deleted and replaced with only the pointer such that no characters exist in place of all instances of the candidate for substitution within the set of content files; and
   storing a single copy of the identical string of characters in the common repository to perform the deduplication on the first content chunk and the second content chunk; wherein the common repository comprises a database storing the single copy of the identical string of characters separately from the set of content files.

2. The computer implemented method according to claim 1, wherein a delimiter separates a content chunk from another content chunk, wherein a user determines the delimiter and size of a content chunk, and wherein the user assigns the predetermined threshold.

3. The computer implemented method according to claim 1, wherein comparing the candidate for substitution with a synonym database to find the match further comprises:
   prompting a user with the plurality of synonym suggestions and a recommendation for the identical string of characters; and
   selecting an appropriate identical string of characters as a replacement for the candidate for substitution in the first content chunk and the second content chuck.

4. The computer implemented method according to claim 3, wherein the recommendation for the identical string of characters is a string of characters identified as the candidate for substitution in the first content chunk.

5. The computer implemented method according to claim 1, wherein the synonym database stores a company recommended string of characters as a primary candidate for substitution, and wherein the synonym database is maintained and documented for consistency by a central group.

6. The computer implemented method according to claim 5, wherein the central group maintains and documents the synonym database at one central location for updates, and wherein the updates are transmitted to a plurality of other locations in the set of content files that reference the synonym database.

7. The computer implemented method according to claim 1, wherein storing the single copy of the identical string of characters in the common repository further comprises:
   forming a report containing the candidate for substitution;
   globally replacing the candidate for substitution with the reference to the identical string of characters in the set of content files; and
   measuring content patterns and duplicate data in the set of content files.

8. The computer implemented method according to claim 1, further comprising:
   identifying identical content chunks in the set of content files above the predetermined threshold;
   replacing a new candidate for substitution with a new reference to an identical string of characters; and
   storing a single copy of the new identical string of characters in the common repository.

9. A system for phrase substitution within chunks of substantially similar content, comprising:
   a processor device, wherein the processor device:
   retrieves from a set of content files stored in a data storage system, a first content chunk and a second content chunk which are identical above a predetermined threshold;
   identifies a candidate for substitution, wherein the candidate for substitution is a string of characters in the second content chunk that is not identical to a corresponding string of characters in the first content chunk;
   compares the candidate for substitution with a synonym database to find a match, wherein the synonym database provides a plurality of synonym suggestions to convert the candidate for substitution in the first content chunk and the second content chuck to an identical string of characters;

replaces the candidate for substitution with a reference to the identical string of characters thereby deduplicating the first content chunk and the second content chunk such that the identical string of characters itself is not substituted in the first content chunk and the second content chunk notwithstanding a pointer to the identical string of characters is created within the first content chunk and the second content chunk in place of the candidate for substitution, the pointer referencing the identical string of characters stored within a common repository, wherein all instances of the candidate for substitution within the set of content files are deleted and replaced with only the pointer such that no characters exist in place of all instances of the candidate for substitution within the set of content files; and stores a single copy of the identical string of characters in the common repository to perform the deduplication on the first content chunk and the second content chunk; wherein the common repository comprises a database storing the single copy of the identical string of characters separately from the set of content files.

10. The system according to claim 9, wherein a delimiter separates a content chunk from another content chunk, wherein a user determines the delimiter and size of a content chunk, and wherein the user assigns the predetermined threshold.

11. The system according to claim 9, wherein comparing the candidate for substitution with a synonym database to find the match further comprises:

prompting a user with the plurality of synonym suggestions and a recommendation for the identical string of characters; and selecting an appropriate identical string of characters as a replacement for the candidate for substitution in the first content chunk and the second content chuck.

12. The system according to claim 11, wherein the recommendation for the identical string of characters is a string of characters identified as the candidate for substitution in the first content chunk.

13. The system according to claim 9, wherein storing the single copy of the identical string of characters in the common repository further comprises:

forming a report containing the candidate for substitution;

globally replacing the candidate for substitution with the reference to the identical string of characters in the set of content files; and measuring content patterns and duplicate data in the set of content files.

14. The system according to claim 9, further comprising:

identifying identical content chunks in the set of content files above the predetermined threshold;

replacing a new candidate for substitution with a new reference to an identical string of characters; and storing a single copy of the new identical string of characters in the common repository.

15. A computer program product for phrase substitution within chunks of substantially similar content, the computer program product comprising a non-transitory computer-readable storage medium having computer-readable program code portions stored therein, the computer-readable program code portions comprising:

a first executable portion that retrieves, by a processor device, from a set of content files stored in a data storage system, a first content chunk and a second content chunk which are identical above a predetermined threshold;

a second executable portion that identifies a candidate for substitution, wherein the candidate for substitution is a string of characters in the second content chunk that is not identical to a corresponding string of characters in the first content chunk;

a third executable portion that compares the candidate for substitution with a synonym database to find a match, wherein the synonym database provides a plurality of synonym suggestions to convert the candidate for substitution in the first content chunk and the second content chuck to an identical string of characters;

a fourth executable portion that replaces the candidate for substitution with a reference to the identical string of characters thereby deduplicating the first content chunk and the second content chunk such that the identical string of characters itself is not substituted in the first content chunk and the second content chunk notwithstanding a pointer to the identical string of characters is created within the first content chunk and the second content chunk in place of the candidate for substitution, the pointer referencing the identical string of characters stored within a common repository, wherein all instances of the candidate for substitution within the set of content files are deleted and replaced with only the pointer such that no characters exist in place of all instances of the candidate for substitution within the set of content files; and a fifth executable portion that stores a single copy of the identical string of characters in the common repository to perform the deduplication on the first content chunk and the second content chunk; wherein the common repository comprises a database storing the single copy of the identical string of characters separately from the set of content files.

16. The computer program product according to claim 15, wherein a delimiter separates a content chunk from another content chunk, wherein a user determines the delimiter and size of a content chunk, and wherein the user assigns the predetermined threshold.

17. The computer program product according to claim 15, wherein comparing the candidate for substitution with a synonym database to find the match further comprises:

prompting a user with the plurality of synonym suggestions and a recommendation for the identical string of characters; and selecting an appropriate identical string of characters as a replacement for the candidate for substitution in the first content chunk and the second content chuck.

18. The computer program product according to claim 17, wherein the recommendation for the identical string of characters is a string of characters identified as the candidate for substitution in the first content chunk.

19. The computer program product according to claim 15, wherein storing the single copy of the identical string of characters in the common repository further comprises:

forming a report containing the candidate for substitution;

globally replacing the candidate for substitution with the reference to the identical string of characters in the set of content files; and measuring content patterns and duplicate data in the set of content files.

20. The computer program product according to claim 15, further comprising:

identifying identical content chunks in the set of content files above the predetermined threshold;
replacing a new candidate for substitution with a new reference to an identical string of characters; and
storing a single copy of the new identical string of characters in the common repository.

\* \* \* \* \*